United States Patent [19]

Bobsein et al.

[11] Patent Number: 5,039,572

[45] Date of Patent: Aug. 13, 1991

[54] HIGH STRENGTH THERMOPLASTIC RESIN/CARBON FIBER COMPOSITES AND METHODS

[75] Inventors: Rex L. Bobsein; Stuart D. Mills, both of Bartlesville, Okla.; Mark L. Stone, Idaho Falls, Id.

[73] Assignee: Phillips Petroleum Company, Bartlesville, Okla.

[21] Appl. No.: 383,751

[22] Filed: Jul. 24, 1989

[51] Int. Cl.$^5$ ................................................ B32B 9/00
[52] U.S. Cl. .................... 428/408; 428/294; 428/902; 428/224; 428/284; 264/257; 264/258; 156/180; 156/171; 156/172; 524/609.2
[58] Field of Search ............... 428/408, 294, 902, 284, 428/224; 524/509; 264/257, 258, 425; 156/180, 171, 172

[56] References Cited

U.S. PATENT DOCUMENTS

| | | | |
|---|---|---|---|
| 3,354,129 | 11/1967 | Edmonds, Jr. et al. | 260/79 |
| 4,238,585 | 12/1980 | Bertozzi | 525/535 |
| 4,376,193 | 3/1983 | Bertozzi | 528/59 |
| 4,605,713 | 8/1986 | Heitz et al. | 525/537 |
| 4,605,732 | 8/1986 | Heitz et al. | 528/388 |
| 4,680,224 | 7/1987 | O'Connor | 428/408 |
| 4,716,216 | 12/1987 | Takekoshi et al. | 528/352 |
| 4,769,424 | 9/1988 | Takekoshi et al. | 525/435 |
| 4,814,224 | 3/1989 | Geibel et al. | 428/408 |
| 4,853,442 | 8/1989 | Nguyen | 528/99 |
| 4,921,558 | 5/1990 | Johnson et al. | 428/408 |

FOREIGN PATENT DOCUMENTS 0215312  8/1986  European Pat. Off. .

Primary Examiner—George F. Lesmes
Assistant Examiner—Richard Charles Weissberger
Attorney, Agent, or Firm—Laney, Dougherty, Hessin & Beavers

[57] ABSTRACT

High strength thermoplastic resin/carbon fiber composites and methods of producing such composites are provided. The composites are comprised of carbon fibers, an amine-terminated poly(arylene sulfide) first resin component, and a second resin component selected from the group consisting of poly(arylene sulfides), polyolefins, polysulfones, polyether sulfones, polyetherimides, polyetherketones, polyethertherketones, polyetherketoneketones, liquid crystal polymers, and mixtures of such resins.

35 Claims, No Drawings

HIGH STRENGTH THERMOPLASTIC RESIN/CARBON FIBER COMPOSITES AND METHODS

BACKGROUND OF THE INVENTION

1. Field of the Invention.

This invention relates generally to poly(arylene sulfide) composites, and more particularly, to poly(arylene sulfide)/carbon fiber composites having improved adhesion between the resin matrix and the carbon fibers in the composite.

2. Description of the Prior Art.

It has long been appreciated that good adhesion between the resin matrix and the reinforcing fibers utilized in composite material is necessary. The usual means employed for enhancing adhesion between the fibers and the resin matrix has been to use a sizing composition to coat the fibers before consolidation with the resin matrix.

Sizing compositions operate in generally one of two ways to aid adhesion. The sizing composition may be chemically active and react to form a chemical bond between the fibers and the matrix, or it may form a more compatible surface on the fibers such that the matrix will more readily spread out on and adhere to the fibers. Where the reinforcing fibers have been glass fibers, compositions containing silanes have been successfully employed as sizings to link the glass fibers and the resin matrix.

The use of carbon fibers in composites has involved different approaches. In the preparation of the better known and older thermoset resin matrix/carbon fiber composites, a number of proprietary sizing compositions have been employed with varying degrees of success. In recent years there has been a growing interest in composites employing thermoplastic resin matrices and carbon fibers. Much of this interest is due to the generally greater processability and shelf life of thermoplastics as compared to thermoset resins as well as to the greater chemical resistance and moisture resistance of thermoplastics such as the poly(arylene sulfides).

Well known poly(arylene sulfides) are poly(phenylene sulfide) and poly(phenylene sulfide/sulfone) which are commercially available under the trademark RYTON ® from the Phillips Petroleum Company, Bartlesville, Okla. Such resins are particularly suitable for use in composites because of their excellent rigidity and heat and electrical resistance as compared to other thermoplastic resins.

Thermoplastic resins, however, pose a number of problems in terms of obtaining composites with good adhesion to reinforcing carbon fibers. The same chemical resistance and relatively low chemical activity which make thermoplastics such as poly(phenylene sulfide) and poly(phenylene sulfide/sulfone) attractive for use in composites, also inhibit effective adhesion to carbon fibers through chemical bonding. Most thermoplastic resins are of a more viscous nature than thermoset resins, and therefore do not physically spread onto carbon fibers as well as thermoset resins. Also, most of the sizing compositions that have been traditionally employed in the thermoset resin composites degrade at the temperatures required to process thermoplastic resins such as the poly(arylene sulfides). Thus, there is a need for a method of producing thermoplastic resin/carbon fiber composites having improved adhesion between the thermoplastic matrices and the carbon fibers as well as for the composites so produced, particularly carbon fiber composites formed of poly(arylene sulfide) and poly(arylene sulfide/sulfone) resins.

SUMMARY OF THE INVENTION

The present invention fulfills the above-mentioned needs by providing carbon fiber reinforced thermoplastic resin composites having improved adhesion between the carbon fibers and the surrounding resin matrices as measured by improvements in transverse tensile and compressive strengths, and by providing methods of producing such composites.

The composites are basically each comprised of carbon fibers, an amine-terminated poly(arylene sulfide) first component and a second thermoplastic resin component selected from the group consisting of poly(arylene sulfides), polyolefins, polysulfones, polyether sulfones, polyetherimides, polyetherketones, polyetheretherketones, polyetherketoneketones, liquid crystal polymers, and mixtures of such resins. In a most preferred embodiment, the second component is comprised of poly(phenylene sulfide) resin.

The amine-terminated poly(arylene sulfide) first resin component is produced by the addition of an aminoorganic thiol compound to a polymerization recipe for a poly(arylene sulfide) prior to the substantial completion of the polymerization. The amine-terminated polymers produced have melt flow rates in the range of from about 10 to about 5000 grams per 10 minutes (as determined by ASTM D-1238, condition 317/0.36, using a 1.250 inch long orifice), and function in a carbon fiber containing composite to improve the adhesion of the thermoplastic matrix to the carbon fibers. Generally, improvement in such adhesion and an improved composite results when the amine-terminated poly(arylene sulfide) component is present in the thermoplastic resin matrix in an amount as low as about 0.5% by weight of the total resin.

The methods of the present invention for producing the above-described improved thermoplastic resin/carbon fiber composites basically comprise combining the components utilized in the composites, i.e., the carbon fibers, the amine-terminated poly(arylene sulfide) first component and the thermoplastic resin second component, followed by forming a composite from the mixture. Various techniques can be utilized for combining the carbon fibers and thermoplastic resin components and forming a composite therefrom, including injection molding and pultrusion. A preferred method of this invention utilizes a pultrusion technique wherein a continuous fiber roving is pulled through a resin matrix comprised of a mixture of the amine-terminated poly(arylene sulfide) first component and thermoplastic resin second component. The fiber roving is impregnated with the resin mixture and is thereafter pulled through a heated forming die which consolidates the carbon fibers and resin matrix into a composite. Variations in the pultrusion process include pulling the carbon fiber roving through the amine-terminated poly(arylene sulfide) component whereby the carbon fibers are impregnated therewith and then pulling the impregnated roving through the thermoplastic resin second component whereby the second component resin is deposited on the roving followed by passing the roving through a heated forming die.

It is, therefore, an object of the present invention to provide thermoplastic resin/carbon fiber composites which possess improved adhesion between the resin matrices and the reinforcing carbon fibers.

A further object of the present invention is the provision of methods for producing thermoplastic resin/carbon fiber composites having improved adhesion between the resin and fibers.

Other and further objects, features and advantages of the present invention will be readily apparent to those skilled in the art upon a reading of the description of preferred embodiments which follows.

DESCRIPTION OF THE PREFERRED EMBODIMENTS

As mentioned above, the thermoplastic resin/carbon fiber composites of this invention which have improved adhesion of the thermoplastic resin to the carbon fibers and consequently improved structural strength are comprised of carbon fibers, an amine-terminated poly(arylene sulfide) resin first component which functions to bring about the adhesion improvement and a thermoplastic resin second component selected from the group consisting of poly(arylene sulfides), polyolefins, polysulfones, polyether sulfones, polyetherimides, etherketoneketones, liquid crystal polymers, and mixtures of such thermoplastic resins.

The amine-terminated poly(arylene sulfide) resin component brings about improved bonding by way of the amineterminal groups to the carbon reinforcing fibers while the polymer portion in general bonds to the second thermoplastic resin component utilized. In addition to such chemical bonding the amine-terminated poly(arylene sulfide) component induces a surface on the carbon fibers such that the second component thermoplastic resin matrix can spread out thereon and more readily adhere thereto.

The terms "poly(arylene sulfide(s)" and "poly(arylene sulfide) resin(s)" are used herein to broadly designate arylene sulfide polymers whether homopolymers, copolymers, terpolymers and the like, or a blend of such polymers. Poly(arylene sulfide) resins which are particularly suitable for use in accordance with the present invention are poly(phenylene sulfide) resins and poly(phenylene sulfide/sulfone) resins.

Poly(phenylene sulfide) resins which are suitable for use in accordance with the present invention are those described in U.S. Pat. Nos. 3,354,129 issued Nov. 21, 1967; 3,919,177 issued Nov. 11, 1975; 4,038,261 issued July 26, 1977; and 4,656,231 issued Apr. 7, 1987, which patents are incorporated herein by reference. Preferred commercially available poly(phenylene sulfide) resins are those manufactured by Phillips Petroleum Company of Bartlesville, Okla. and marketed as RYTON® poly(phenylene sulfide) resins having melt flows of from about 10 to about 1000 grams per 10 minutes as determined by ASTM D1238, condition 315/5.0.

Poly(phenylene sulfide/sulfone) resins and their production are described in U.S. Pat. No. 4,016,145 issued Apr. 5, 1977 and U.S. Pat. No. 4,127,713 issued Nov. 28, 1978, which patents are incorporated herein by reference. Preferred commercially available poly(phenylene sulfide/sulfone) resins are those manufactured by Phillips Petroleum Company and marketed as RYTON®S poly(phenylene sulfide/sulfone) resins having melt flows of from about 0.5 to about 350 grams per 10 minutes as determined by ASTM D1238, condition 343/5.0.

In preparing amine-terminated poly(arylene sulfide) resins, and particularly poly(phenylene sulfide) and poly(phenylene sulfide/sulfone) resins, the basic production method described in the above-referenced patents is utilized wherein a sulfur compound is reacted with a polyhalo-substituted aromatic compound in a polar organic solvent. In addition, an alkali metal carboxylate, e.g., sodium acetate, can be included in the reaction mixture to produce higher molecular weight polymers.

Compounds which have been found useful as a sulfur source in the production method generally include alkali metal sulfides, alkali metal hydrosulfides and hydrogen sulfides. Suitable alkali metal sulfides include lithium sulfide, sodium sulfide, potassium sulfide, rubidium sulfide and cesium sulfide. Suitable alkali metal hydrosulfides include lithium hydrosulfide, sodium hydrosulfide, potassium hydrosulfide, rubidium hydrosulfide and cesium hydrosulfide. Sodium sulfide and sodium hydrosulfide are presently preferred as suitable first sulfur sources. It is often convenient to employ these first sulfur source compounds as aqueous solutions or dispersions in the process of our invention.

The polyhalo-substituted aromatic compounds which can be employed are compounds wherein the halogen atoms are attached to aromatic ring carbon atoms. Preferably, the polyhalo-substituted aromatic compounds are selected from the group consisting of p-dihalobenzenes having the formula

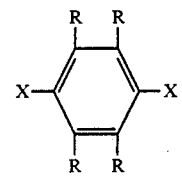

m-dihalobenzenes having the formula

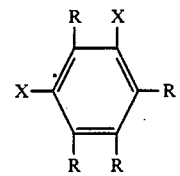

and o-dihalobenzenes having the formula

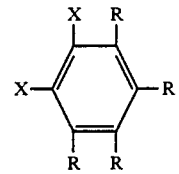

wherein X is a halogen selected from the group consisting of chlorine, bromine and iodine and R is hydrogen or an alkyl radical of 1–4 carbon atoms. For reasons of availability and generally good results it is preferred that dichlorobenzenes be employed with p-dichlorobenzene being especially preferred. Mixtures of suitable polyhalo-substituted aromatic compounds can also be employed.

Further, polyhalo-substituted aromatic compounds having more than two halogen substituents per molecule can be employed. These compounds are represented by the formula $R'(X)_n$ wherein X is as previously defined, $R'$ is a polyvalent aromatic radical of 6 to about 16 carbon atoms having a valence n, and n is an integer of 3–6. Generally, the polyhalo-substituted aromatic compounds represented by the formula $R'(x)_n$ when employed according to our invention are optional components utilized in small amounts in admixture with suitable dihalo-substituted aromatic compounds.

Examples of some suitable polyhalo-substituted aromatic compounds include 1,4-dichlorobenzene, 1,3-dichlorobenzene, 1,3,5-trichlorobenzene, 1,2-dichlorobenzene, 1,4-dibromobenzene, 1,4-diiodobenzene, 1-chloro-4-bromobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1,2,3-trichlorobenzene, 1,2,4-trichlorobenzene, 1,3-dichloro-5-bromobenzene, 2,4,6-trichlorotoluene, hexachlorobenzene, 2,2',4,4'-tetrachlorobiphenyl, 2,2',6,6'tetrabromo-3,3',5,5'-tetramethylbiphenyl, 4,4'-dichlorobiphenyl and the like.

Although the amount of polyhalo-substituted aromatic compound relative to the total of the sulfur source compounds can vary over a wide range, generally the amount employed will be in the range of from about 0.5 mole percent excess of aromatic halide to about 10 mole percent excess of aromatic halide relative to the total sulfur source compounds. A 2 to 3 mole percent excess is preferred.

Polar organic compounds which can be employed include organic amides, lactams, ureas, sulfones and the like. Examples of suitable polar organic compounds include N-methyl-2-pyrrolidone, N-methylcatrolactam, hexamethylphosphoramide, tetramethylurea, N,N'-ethylene dipyrrolidone, pyrrolidone, caprolactam, N-ethylcaprolactam, 1,3-dimethyl-2-imidazolidinone, tetramethylene sulfone, diphenyl sulfone, N-ethyl-2-pyrrolidone, 1-methyl-4-isopropyl-2-piperazinone, 1,4-dimethyl-2-piperazinone, and mixtures thereof. For reasons of availability, stability and generally good results, N-methyl-2-pyrrolidone is the preferred polar organic compound. The amount of polar organic compound employed can be expressed in terms of a molar ratio of polar organic compound to total sulfur source compounds. Thus, this ratio will be about 1.5:1 to about 25:1, preferably about 2:1 to about 8:1.

Although the reaction temperature at which the polymerization is conducted can vary over a wide range, generally it will be about 125° C. to about 375° C., preferably about 175° C. to about 350° C. The reaction time can vary widely, depending in part on the reaction temperature, but generally will be about 6 minutes to about 72 hours, preferably about 1 hour to about 8 hours. The pressure should be sufficient to maintain the organic components of the reaction mixture substantially in the liquid phase. The arylene sulfide polymers produced can be separated from the reaction mixture by conventional procedures, e.g., by filtration of the polymer, followed by washing with water or by dilution of the reaction mixture with water, followed by filtration and water washing of the polymer.

In order to produce amine-terminated poly(arylene sulfide) resins, an amino-organic thiol compound is added to the polymerization reaction mixture. The addition can be made before polymerization conditions are established, or as the polymerization reaction proceeds. The amine-terminated poly(arylene sulfide) produced should have a melt flow in the range of from about 10 to about 5000 grams per 10 minutes as determined by ASTM 1238, condition 317/0.36.

The amino-organic thiol compound can be represented by the formula Z—S—R" wherein Z is a halogen-free cyclic aminoorganic radical preferably containing a total of about 5 to about 25 carbon atoms. Z can be selected from amino-carbocyclic and amino-heterocyclic radicals having 1 to 4 heteroatoms as cycle members. Said heteroatoms are individually selected from the group consisting of nitrogen, oxygen and sulfur. The halogen-free cyclic amino-organic radical Z can also have 0 to about 4 substituents selected from the group consisting of alkyl, cycloalkyl, aryl, alkoxy, aryloxy, acyl, aroyl, alkoxycarbonyl, alkanamido, alkylamino, and alkylsulfonyl radicals. The —S—R" portion of the Z—S—R" compound is attached directly to a carbon atom which is a cycle member of Z.

R" is selected from the group consisting of H and M where M is a metal selected from the group consisting of lithium, sodium, potassium, rubidium, cesium, magnesium, calcium, strontium and barium. Thus, the amino-organic thiol compound can be employed as the thiol per se or as a metal salt thereof, i.e., a metal thiolate, wherein the metal is selected from the list given above. When a metal thiolate is employed according to our invention, it can be formed in situ from the reaction of the amino-organic thiol with a suitable metal compound such as a metal oxide, metal hydride or metal hydroxide where the metal is selected from the list given above. Examples of suitable metal compounds for use in the in situ formation of the metal thiolate include lithium hydroxide, sodium hydroxide, potassium hydroxide, rubidium hydroxide, cesium hydroxide, lithium hydride, sodium hydride, magnesium oxide, calcium oxide, strontium oxide and barium oxide.

Examples of suitable halogen-free cyclic amino-organic radicals Z in the amino-organic thiol compound Z—S—R" include 2- and 4-aminophenyl, 2- and 4'-aminobiphenyl, aminonaphthyl and aminopyridyl.

As mentioned above, the amino-organic thiol compound can be added to the polymerization reaction mixture in various ways and at various times. However, it is particularly convenient to add the amino-organic thiol compound in admixture with a portion of the polar organic compound component that is utilized prior to carrying out the polymerization reaction. The amount of amino-organic thiol compound employed can be expressed in terms of a molar ratio of amino-organic thiol compound to inorganic sulfur source used. This ratio is in the range of from about 0.0001:1.00 to about 0.10:1.00. As mentioned above, the amine-terminated polymers produced should have a melt flow of from about 10 to about 5000 grams per 10 minutes, and the amount of aminoorganic thiol compound used can be varied to obtain such desired melt flow.

Generally, the polymerization reaction is conducted at a temperature in the range of from about 125° C. to about 375° C., preferably about 175° C. to about 350° C. The reaction time can vary widely depending in part on reaction temperature, but generally the time will range from about 6 minutes to about 72 hours, preferably from about 1 to about 8 hours. The pressure should be sufficient to maintain the organic components of the reaction mixture substantially in the liquid phase. Upon completion of the reaction, the amine-terminated arylene sulfide polymers produced can be separated from the reaction mixture by conventional procedures, e.g., by filtration, followed by washing with water or by diluting the reaction mixture with water, followed by filtration and water washing of the polymer.

As will be understood by those skilled in the art, when amine-terminated poly(arylene sulfide/sulfone) resin is produced, the method described above can be used except that dihaloaromatic sulfones are employed in the polymerization reaction. The dihaloaromatic sulfones which can be used are represented by the formula

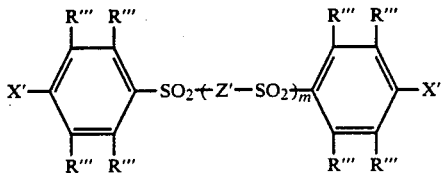

wherein

X' is selected from the group consisting of fluorine, chlorine, bromine and iodine;

Z' is a divalent radical selected from the group consisting of

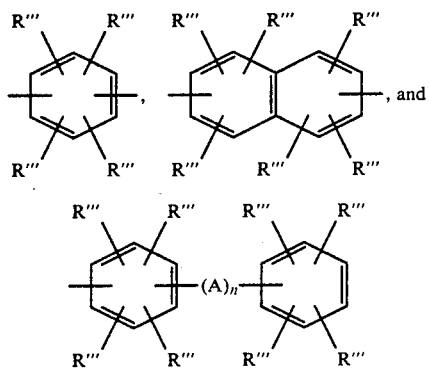

m is 0 or 1;
n is 0 or 1;

A is selected from the group consisting of oxygen sulfur, sulfonyl, and $CR'''_2$; and each $R'''$ is selected from the group consisting of hydrogen and alkyl radicals having 1 to about 4 carbon atoms, the total number of carbon atoms in all the $R'''$ groups in the molecule being 0 to about 12.

Examples of some dihaloaromatic sulfones that can be employed include bis(p-fluorophenyl) sulfone, bis(p-chlorophenyl) sulfone, p-chlorophenyl p'-bromophenyl sulfone, bis(2,5-dipropyl-4-chlorophenyl) sulfone, and the like.

The carbon fibers which are utilized in the composites of the present invention can take various forms depending upon the particular method used for producing the composite. For example, when the composites are injection molded using an injection molding machine, the carbon fibers are chopped. When the composites are formed by pultrusion methods, long length carbon fibers can be used, but continuous carbon fibers are most preferred. The carbon fibers are in the form of individual rovings or bundles. Woven carbon fiber fabrics can also be used. In whatever form the carbon fibers take, they are generally present in the composite in an amount in the range of from about 10% to about 80% by weight of the composite.

The second thermoplastic resin component can be and preferably is a poly(arylene sulfide) resin produced as described above, but without amine termination. Poly(phenylene sulfide) resins or poly(phenylene sulfide/sulfone) resins or mixtures of such resins are particularly preferred. However, other thermoplastic resins such as polyolefins, polysulfones, polyether sulfones, polyetherimides, polyetherketones, polyetheretherketones, polyetherketoneketones, liquid crystal polymers, and mixtures of such resins can be used. The various resins can be used individually, in admixture with each other, or in admixture with poly(arylene sulfide) resins. Generally, the two thermoplastic resin components are present in the composites of the present invention in a total amount in the range of from about 20% to about 90% by weight of the composite. Of the total amount of thermoplastic resin utilized in the composite, the amine-terminated poly(arylene sulfide) resin can be included therein in an amount in the range of from about 0.5% to about 99.5% by weight of the total resin. Preferably, the amine-terminated poly(arylene sulfide) resin is present in the total resin utilized in an amount in the range of from about 0.5% to about 50% by weight of the total resin.

As mentioned above, the amine-terminated poly(arylene sulfide) component of the composite can be applied to the carbon fibers prior to impregnating the carbon fibers with the second thermoplastic resin component. When this technique is used, however, the amount of amine-terminated poly(arylene sulfide) resin generally cannot be more than about 0.5% by weight of the formed composite because higher quantities on the fibers cause them to stick together. A more preferred technique is to combine the amine-terminated poly(arylene sulfide) first component resin with the second component resin in the greater amounts described above.

While various methods of producing the improved composites of the present invention can be utilized, such methods basically comprise the steps of mixing carbon fibers with thermoplastic resin comprised of an amine-terminated poly(arylene sulfide) resin first component and a thermoplastic resin second component selected from the group consisting of poly(arylene sulfide) resin, polyolefin resin, polysulfones, polyether sulfones, polyetherimides, polyetherketones, polyetheretherketones, polyetherketoneketones, liquid crystal polymers, and mixtures of such resins; followed by the step of consolidating the mixture into a formed composite.

The preferred method of producing composites of this invention utilizes the pultrusion technique wherein a roving of carbon fibers is pulled through a thermoplastic resin bath whereby the roving is impregnated with the thermoplastic resin followed by pulling the impregnated roving through a heated forming die to consolidate the thermoplastic resin matrix and carbon fibers into a composite. Such a pultrusion technique for producing such a composite is described in U.S. Pat. No. 4,680,224 to O'Connor, which patent is incorporated herein by reference. The thermoplastic resin bath can be a mixture of the amine terminated poly(arylene sulfide) resin first component and thermoplastic resin second component, or separate thermoplastic resin baths can be used whereby the roving is first pulled through a resin bath of the amine-terminated polymer first component followed by being pulled through a resin bath containing the thermoplastic resin second component. The terms "consolidate" and "consolidating" are used herein to mean forming the resin mixture and carbon fibers in the presence of heat into a composite of desired shape having the carbon fibers disposed within a resin matrix.

In order to further illustrate the improved composites and methods of the present invention, the following examples are presented. The particular reactants, conditions, ratios and the like as well as the ingredients and components used are intended to be illustrative of the invention and not limiting thereof.

EXAMPLE 1

An amine-terminated poly(phenylene sulfide) resin was prepared by reacting 6 moles of sodium hydrosulfide, 6.15 moles of para-dichlorobenzene and 0.04538 mole of 4-aminobenzene thiol (0.76 mole % based on sulfur) in 16.56 moles of N-methyl-2-pyrrolidone and 6.035 moles of sodium hydroxide. The polymerization reaction was carried out for successive 1-hour periods while stirring at 600 rpm at 235° C. the first hour, 265° C. the second hour and 280° C. the third hour. The polymers so produced had a melt flow of 87.7 grams/10 minutes as determined by ASTM 1238, condition 317/0.36, using a 1.250 inch long orifice.

Composites were formed using carbon fibers produced by Hercules, Inc. of Wilmington, Del. under the trade designation AS4-12K. Such carbon fibers which included a sizing applied by Hercules, Inc. were used (designated as G-sized fibers) as were the same carbon fibers without sizing. Carbon fiber rovings were pulled from creels through a resin bath containing an agitated aqueous slurry of approximately 87% by weight Phillips Petroleum Company RYTON® poly(phenylene sulfide) resin (PRO9) and 13% by weight of the amine-terminated poly(phenylene sulfide) polymers produced as described above. The resulting impregnated roving was pulled through a drier at a temperature of 740° F., through an over-and-under die and then through a heated forming die at a temperature of 628° F. The resulting consolidated composite was cut into sections which were pressed into laminates for testing.

Both laminates formed of the carbon fibers including sizing and those formed of carbon fibers without sizing were tested for strength properties. That is, longitudinal tensile strength was determined in accordance with ASTM D-638, transverse tensile strength was determined in accordance with ASTM D-638, compressive strength in accordance with ASTM D3410 (ITRII method) and flexural strength in accordance with ASTM D-790. The results of such strength tests are shown in Table I below.

TABLE I

| Fiber Type/Composite | Avg. Longitudinal Tensile (KSI) | Avg. Transverse Tensile (KSI) |
|---|---|---|
| G-sizing | 232.67 | 2.31 |
| No Sizing | 260.90 | 4.42 |
| | Avg. Compressive (KSI) | Avg. Flexural (KSI) |
| G-sized | 123.30 | 216.22 |
| No Sizing | 135.60 | 260.59 |

The transverse tensile and compressive strengths of the laminates are the best indicators of the adhesion between the carbon fibers and the thermoplastic matrices of the laminates. From the Table I results, it can be seen that laminates produced in accordance with the present invention using carbon fibers without sizing had the best adhesion.

EXAMPLE 2

This Example follows the procedures of Example 1 in examining commercially sized and non-sized carbon fibers, with the exception that the impregnated non-sized rovings were dried at 760° F. as opposed to 780° F. Strength testing procedures were also identical to Example 1. The preparation of amine-terminated poly(phenylene sulfide) resin was the same as described in Example 1 with the exception that the mole percent of the 4-aminobenzene thiol compound used in the process was increased to 3.78 mole percent (based on sulfur) producing polymers having a melt flow of 2358 grams/10 minutes.

Results from the strength testing of the laminates produced are shown in Table II below.

TABLE II

| Fiber Type/Composite | Avg. Longitudinal Tensile (KSI) | Avg. Transverse Tensile (KSI) |
|---|---|---|
| G-sizing | 241.10 | 2.55 |
| No Sizing | 226.33 | 3.29 |
| | Avg. Compressive (KSI) | Avg. Flexural (KSI) |
| G-sized | 141.03 | 224.62 |
| No Sizing | 126.30 | 235.95 |

EXAMPLE 3

A different amino-organic thiol compound, i.e., 2-aminobenzene thiol, was used in the preparation of the amine-terminated poly(phenylene sulfide) resin in this Example, but the same quantity as in Example 2 was used, i.e., 3.78 mole percent (based on sulfur). The fiber contained no sizing. The production of laminates and their testing were the same as Example 1. The terminated polymers had a melt flow of 1838 grams/10 minutes. The laminates prepared had an average longitudinal tensile strength of 225.50 KSI, an average transverse tensile strength of 2.15 KSI, an average compressive strength of 137.07 KSI and an average flexural strength of 229.48 KSI.

EXAMPLE 4

Example the 2-aminobenzene thiol of Example 3 was used in the quantity of Example 1, namely 0.76 mole percent (based on sulfur). The fiber contained no sizing. The preparation of laminates and their testing were the same as Example 1. The resulting terminated polymers had a melt flow of 64.3 grams/10 minutes. The laminates produced had an average longitudinal tensile strength of 252.77 KSI, an average compressive strength of 133.70 KSI, and an average flexural strength of 223.52 KSI. The average transverse tensile strength was not measured.

EXAMPLE 5

As a control, laminates were formed using the procedures described in Example 1 from composites including G-sized carbon fibers and resin matrices of RYTON® poly(phenylene sulfide) (PRO9) containing no amine-terminated polymers. Strength testing of these laminates gave an average longitudinal tensile strength of 255.63 KSI, an average transverse tensile strength of 4.03 KSI, an average longitudinal compressive strength of 113.87 KSI, and an average longitudinal flexural strength of 269.70 KSI.

It can be seen from the Examples above that the best results, using the criteria of improved transverse tensile and compressive strengths, are obtained from carbon fibers that have not been previously sized as compared to those that have been sized. Also, the examples show that the use of amine-terminated poly(phenylene sulfide) in the resin matrix in accordance with the present invention improves the adhesion between the resin matrix and carbon fibers.

Thus, the present invention is well adapted to carry out the objects and attain the ends and advantages mentioned above as well as those inherent therein. While preferred embodiments of the invention have been described for the purpose of this disclosure, changes in the components and the performance of steps can be made by those skilled in the art, which changes are encompassed within the spirit of this invention as defined by the appended claims.

What is claimed is:

1. A high strength thermoplastic resin/carbon fiber composite comprising:
   carbon fibers;
   an amine-terminated poly(arylene sulfide) first resin component; and
   a second resin component selected from the group consisting of poly(arylene sulfides), polyolefins, polysulfones, polyether sulfones, polyetherimides, polyetherketones, polyetheretherketones, polyetherketoneketones, liquid crystal polymers, and mixtures of such resins.

2. The composite of claim 1 wherein said carbon fibers are present in an amount in the range of from about 10% to about 80% by weight of the total resin in said composite.

3. The composite of claim 2 wherein said amine-terminated poly(arylene sulfide) first resin component is present in an amount in the range of from about 0.5% to about 99.5% by weight of the thermoplastic resin of said composite.

4. The composite of claim 3 wherein said amine-terminated poly(arylene sulfide) resin has a melt flow in the range of from about 10 to about 5000 grams per 10 minutes as determined by ASTM D1238, condition 317/0.36, using a 1.250 inch long orifice.

5. The composite of claim 3 wherein said amine-terminated poly(arylene sulfide) resin is an amine-terminated poly(phenylene sulfide) resin.

6. The composite of claim 3 wherein said amine-terminated poly(arylene sulfide) resin is an amine-terminated poly(phenylene sulfide/sulfone) resin.

7. The composite of claim 3 wherein said second resin component is one of or a mixture of poly(arylene sulfide) resins.

8. The composite of claim 5 wherein said second resin component is selected from poly(phenylene sulfide) resin, poly(phenylene sulfide/sulfone) resin and mixtures of such resins.

9. A method of producing a high strength thermoplastic resin/carbon fiber composite comprising the steps of:
   mixing carbon fibers with an amine-terminated poly(arylene sulfide) first resin component and a second resin component selected from the group consisting of poly(arylene sulfides), polyolefins, polysulfones, polyether sulfones, polyetherimides, polyetherketones, polyetheretherketones, polyetherketoneketones, liquid crystal polymers, and mixtures of such resins; and consolidating said mixture into a composite of carbon fibers in a resin matrix.

10. The method of claim 9 wherein said carbon fibers are present in said mixture in an amount in the range of from about 10% to about 80% by weight thereof.

11. The method of claim 10 wherein said amine-terminated poly(arylene sulfide) first resin component is present in said mixture an amount in the range of from about 0.5% to about 99.5% by weight of the total of said first and second resin components.

12. The method of claim 11 wherein said amine-terminated poly(arylene sulfide) resin has a melt flow in the range of from about 10 to about 5000 grams per 10 minutes as determined by ASTM D1238, condition 317/0.36, using a 1.250 inch long orifice.

13. The method of claim 11 wherein said amine-terminated poly(arylene sulfide) resin is an amine-terminated poly(phenylene sulfide) resin.

14. The method of claim 11 wherein said amine-terminated poly(arylene sulfide) resin is an amine-terminated poly(phenylene sulfide/sulfone) resin.

15. The method of claim 11 wherein said second resin component is one of or a mixture of poly(arylene sulfide) resins.

16. The method of claim 13 wherein said second resin component is selected from poly(phenylene sulfide) resin, poly(phenylene sulfide/sulfone) resin and mixtures of such resins.

17. A high strength thermoplastic resin/carbon fiber composite produced in accordance with the method of claim 9.

18. A high strength thermoplastic resin/carbon fiber composite produced in accordance with the method of claim 10.

19. A high strength thermoplastic resin/carbon fiber composite produced in accordance with the method of claim 11.

20. A high strength thermoplastic resin/carbon fiber composite produced in accordance with the method of claim 13.

21. A high strength thermoplastic resin/carbon fiber composite produced in accordance with the method of claim 16.

22. A method of producing a high strength thermoplastic resin/carbon fiber composite comprising the steps of:
   impregnating a continuous carbon fiber roving with a thermoplastic resin mixture comprised of an amine terminated poly(arylene sulfide) first resin component and a second resin component selected from the group consisting of poly(arylene sulfides), polyolefins, polysulfones, polyether sulfones, polyetherimides, polyetherketones, polyetheretherketones, polyetherketoneketones, liquid crystal polymers, and mixtures of such resins; and
   pulling said impregnated roving through a heated forming die whereby said impregnated roving is consolidated into a composite.

23. The method of claim 22 wherein said carbon fibers are present in said impregnated roving in an amount in the range of from about 50% to about 80% by weight of said impregnated roving.

24. The method of claim 22 wherein said amine-terminated poly(arylene sulfide) first resin component is present in said impregnated roving in an amount in the range of from about 0.5% to about 99.5% by weight of said thermoplastic resin mixture.

25. The method of claim 24 wherein said amine-terminated poly(arylene sulfide) resin is an amine-terminated poly(phenylene sulfide) resin.

26. The method of claim 24 wherein said amine-terminated poly(arylene sulfide) resin is an amine-terminated poly(phenylene sulfide/sulfone) resin.

27. The method of claim 24 wherein said second resin component is one of or a mixture of poly(arylene sulfide) resins.

28. The method of claim 25 wherein said second resin component is selected from poly(phenylene sulfide) resin, poly(phenylene sulfide/sulfone) resin and mixtures of such resins.

29. The method of claim 24 wherein said step of impregnating said continuous carbon fiber roving with said resin mixture comprises pulling said roving through a bath containing said resin mixture.

30. The method of claim 24 wherein said step of impregnating said continuous carbon fiber roving with said resin mixture comprises:
pulling said roving through a bath containing said amine-terminated poly(arylene sulfide) resin first component; and then
pulling said roving through a second bath containing said second component resin.

31. The method of claim 29 or 30 wherein said amine-terminated first resin component is an amine-terminated poly(phenylene sulfide) resin and said second resin component is a poly(phenylene sulfide) resin.

32. A high strength thermoplastic resin/carbon fiber composite formed in accordance with the method of claim 22.

33. A high strength thermoplastic resin/carbon fiber composite formed in accordance with the method of claim 24.

34. A high strength thermoplastic resin/carbon fiber composite formed in accordance with the method of claim 28.

35. A high strength thermoplastic resin/carbon fiber composite formed in accordance with the method of claim 30.

* * * * *

UNITED STATES PATENT AND TRADEMARK OFFICE
CERTIFICATE OF CORRECTION

PATENT NO. : 5,039,572

DATED : August 13, 1991

INVENTOR(S) : Rex L. Bobsein, Stuart D. Mills, and Mark L. Stone

It is certified that error appears in the above-identified patent and that said Letters Patent is hereby corrected as shown below:

IN THE ABSTRACT

Lines 9-10, change "polyethertherketones" to --polyetheretherketones--.

Col. 3, line 23, after "polyetherimides," insert --polyetherketones, polyetheretherketones,--;

Col. 3, lines 23-24, change "etherketoneketones" to --polyetherketoneketones--;

Col. 9, Table I, line 51, change "G-sizing" to --G-sized--; and

Col. 10, line 41, at the beginning of the paragraph before "Example" insert --In this--.

Signed and Sealed this

Tenth Day of November, 1992

*Attest:*

DOUGLAS B. COMER

*Attesting Officer*   *Acting Commissioner of Patents and Trademarks*